March 1, 1955    L. W. WIGHTMAN    2,703,371
SUBMERSIBLE DYNAMOELECTRIC MACHINE
Filed Dec. 30, 1953
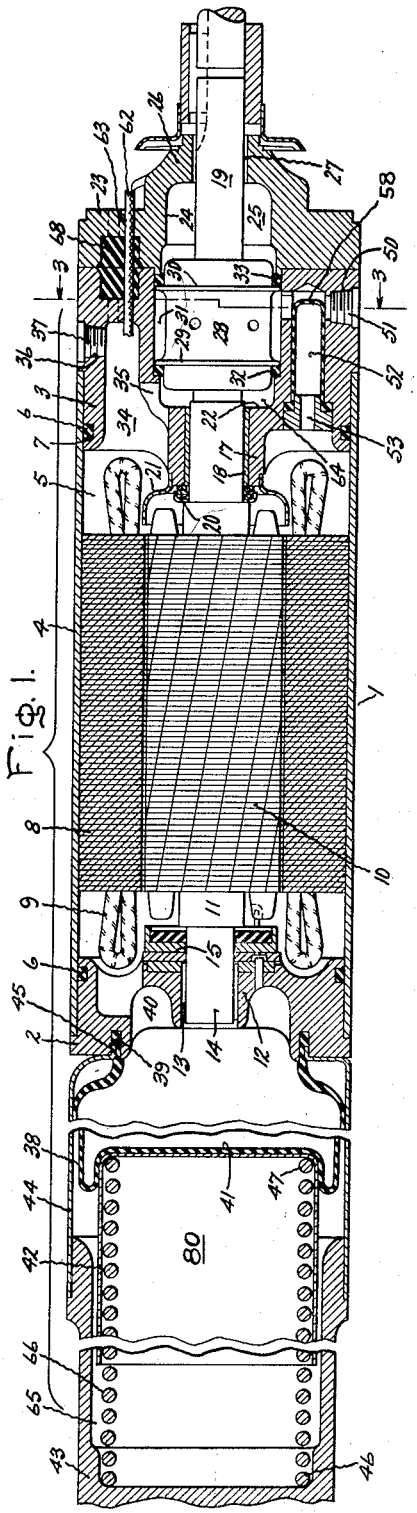
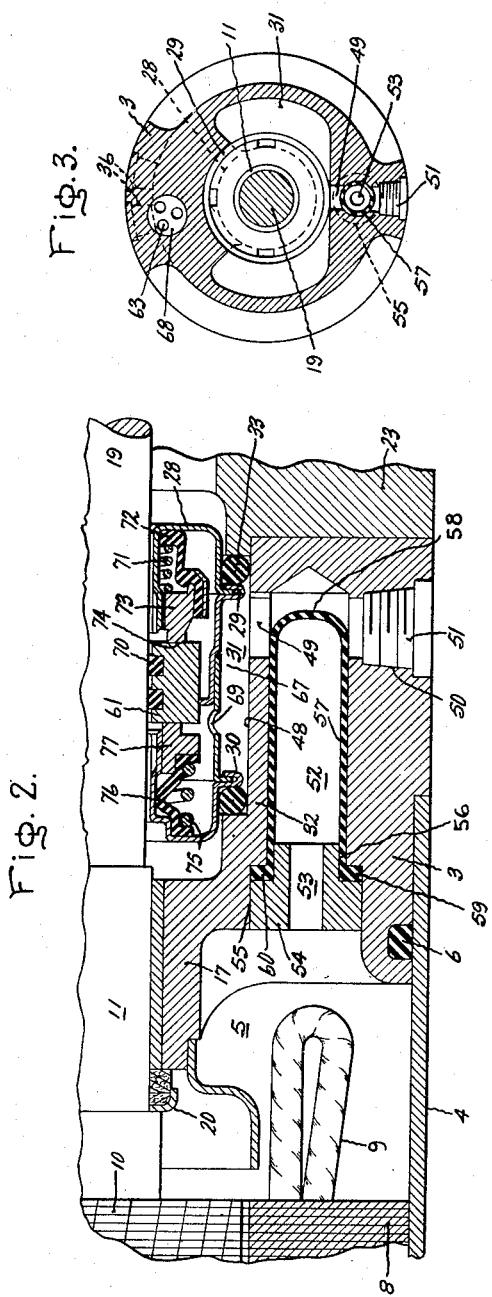
Inventor:
Lawrance W. Wightman,
by *Robert G. [illegible]*
His Attorney.

United States Patent Office 2,703,371
Patented Mar. 1, 1955

2,703,371

SUBMERSIBLE DYNAMOELECTRIC MACHINE

Lawrance W. Wightman, Fort Wayne, Ind., assignor to General Electric Company, a corporation of New York Application December 30, 1953, Serial No. 401,233

5 Claims. (Cl. 310—87)

This invention relates to dynamoelectric machines and more particularly to dynamoelectric machines adapted to be operated while submersed in a liquid, such as submersible pump motors.

In certain pumping applications, it is desirable to position the pump impeller and its driving motor adjacent the bottom of the well casing. In this type of installation, the motor is generally arranged below the pump and is thus surrounded with the liquid in the well, usually water. It is necessary in the design of motors for this type of application to provide a sealing arrangement for preventing the liquid in the well from entering the motor. One such structure designed to prevent entrance of the liquid in the well into the motor is disclosed in copending application Serial Number 366,209 filed July 6, 1953, of Richard W. Dochterman, assigned to the assignee of the present invention. Dochterman discloses means for maintaining the pressure of a liquid in the motor cavity, such as oil, above the pressure of the liquid in the well; by this means any leakage through the shaft seal is out of the motor by the oil instead of into the motor by the well liquid. However, even with such an improved arrangement, it is still desirable to keep leakage of fluid out of the motor cavity to an absolute minimum. It has been found that a double shaft seal, with the seals being in tandem, will substantially decrease the chance of outward leakage due to a defective seal. However, such an arrangement means there will be a great amount of heat generated by the rotating seals. For this reason, and for lubrication purposes, there is usually a liquid such as oil filling the space around the two seals. A disadvantage of the double seal construction in the past has been that the oil about the seals would heat up during prolonged running of the motor to an extent where it had highly deleterious effects on the seals themselves, thereby shortening their lives. It is, therefore, desirable to provide a submersible dynamoelectric machine construction having a double shaft seal with means to accommodate expansion of the seal oil when heated, thereby preventing an undue increase in pressure about the seals and a consequent shortening of seal life, such means being simple, inexpensive, and easily assembled.

It is, therefore, an object of this invention to provide an improved submersible dynamoelectric machine construction incorporating the desirable features set forth above.

Further objects and advantages of this invention will become apparent and the invention will be better understood by reference to the following description and the accompanying drawing. The features of novelty which characterize this invention will be pointed out with particularity in the claims annexed to and forming a part of this specification.

In accordance with one aspect of this invention, a dynamoelectric machine is provided having a casing defining a cavity in which the stator and the rotor are arranged. One end of the shaft extends out of the cavity and a double seal is provided mounted on the casing and surrounding the shaft to prevent the entrance of liquid into the cavity. A collapsible bag arrangement is provided as is more fully explained in the aforesaid application Serial Number 366,209 to make the pressure on the inside of the seal be at all times greater than that of the well liquid outside the seal. The space about the tandem seals is filled with a fluid such as oil and is in part bounded by a collapsible member whose other surface is accessible to the pressure of the fluid within the motor cavity. When the seal fluid pressure increases it will cause the collapsible member to retract into the motor cavity since the seal fluid pressure will then exceed the motor cavity fluid pressure and this will continue until the two pressures are equalized. By this means the seal fluid is allowed to expand and avoid harm to the shaft seals themselves.

In the drawing:

Fig. 1 is a side view, partly in cross-section, illustrating the improved submersible dynamoelectric machine construction of this invention.

Fig. 2 is a fragmentary view, partly in cross-section, illustrating a clearer detail the seal oil accommodating means forming this invention, which also appears in Fig. 1;

Fig. 3 is a section taken on the line 3—3 of Fig. 1.

Referring now to Fig. 1, there is shown a submersible dynamoelectric machine, such as a submersible pump motor, generally identified as 1, it being understood that the motor 1 will ordinarily be vertically arranged in a well casing rather than horizontally arranged as shown in the drawing. The motor 1 is provided with a first end flange 2 and a second end flange 3 spaced therefrom. An outer cylindrical shell member 4 surrounds the outer peripheries of end flange members 2 and 3 defining a stator and rotor cavity therewith. Annular seals 6, formed from suitable resilient material such as rubber or neoprene, are arranged in suitable annular grooves 7 in the outer peripheries of end flange members 2 and 3 respectively. Seals 6 serve to prevent the entrance of liquid from the well into the cavity 5 of the machine past the shell 4 and end flange members 2 and 3.

A stator member 8, formed with a plurality of laminations of relatively thin magnetic material, is mounted within shell 4 in cavity 5, and has suitable field windings 9 arranged in winding slots therein (not shown). Rotor 10 is positioned within the bore of stator 8 and is mounted on shaft 11. End flange member 2 has a central hub portion 12 with a sleeve bearing 13 mounted therein in which end 14 of shaft 11 is rotatably positioned. A thrust bearing assembly 15 is secured to the inner face of hub 12 of end flange 2.

End flange 3 is provided with an inwardly extending hub 17 with a sleeve bearing 18 formed therein in which extension 19 of shaft 11 is rotatably positioned. A thrust washer assembly 20 is mounted on shaft extension 19 between a shoulder of shaft 11 and the end of hub 17 of end flange 3. Annular baffle 21 is mounted on the outer periphery of hub portion 17 of end flange 5 and surrounds thrust assembly 20. An annular recess 22 is formed in the outer face of end flange 3 and another end flange 23 is provided arranged abutting the outer face of end flange 3 and having a similar annular recess 24 which, with recess 22 in end flange member 3, defines a seal cavity 25. End flange member 23 is also provided with a hub portion 26 having an aperture 27 formed therein through which shaft extension 19 extends.

A double seal assembly 28 is mounted in seal cavity 25 surrounding shaft 19. Seal 28 has a housing 67 with two outer annular flanges 29 and 30 positioned in a recess 31 formed in end flange member 3, and is sealed in assembled position by two resilient annular rings 32 and 33, flange 29 bearing against ring 32 while flange 30 bears against ring 33. Hub portion 17 of end flange member 3 is connected to the outer peripheral portion thereof by means of a plurality of radially extending ribs 34, thereby defining passages 35 so that the stator and rotor cavity 5 communicates with portion 64 of seal cavity 25. A pair of suitable openings 36 are formed in the outer peripheral surface of end flange 3, in which plugs 37 are positioned to provide for filling the interior of the machine with a suitable fluid such as oil, and for exhausting air from the machine.

A cord 62, carrying leads connecting motor 1 to a source of power (not shown) extends through each opening 63 (Fig. 3) in flanges 3 and 23. A resilient grommet 68 is provided where the flanges 3 and 23 meet to seal the lead opening and prevent any fluid from entering the motor therethrough.

In order to prevent the entrance of the well liquid into the cavity 5 of the motor 1 along the shaft extension 19 the arrangement disclosed in the aforesaid application Serial Number 366,209 is used. A bag 38 has its open end secured in annular groove 39 of flange 2. Thus the fluid filling the motor cavity 5 also fills bag 38 since the bag is connected to cavity 5 by channels 40 so as to form one wall thereof. Bag 38 has a flat bottom portion 41 in which a spring retainer member 42 is adapted to fit. A cover portion 43 is secured to a shell member 44 which in turn is held at 45 in annular groove 39 of flange 2. Cover portion 43 has therein a cavity 65 in which a suitable coil spring 66 is arranged with its end 46 in engagement with the bottom of cover portion 43 and its other end 47 in engagement with spring retainer 42. Spring 66 thereby exerts pressure on the bottom 41 of bag 38 and tends to turn the bag inside out. Furthermore, housing 43 has an opening (not shown) whereby the well liquid has access to cavity 80 within retainer 42. Since the well liquid pressure is thus brought to bear against bottom 41 of bag 38, equilibrium will not be attained until the pressure of the fluid in cavity 5 equals that of the well liquid. However, because of spring 66, the fluid pressure of the fluid in cavity 5 must equal that of both the well liquid and of spring 66. Thus, spring 66 provides a differential which insures that the fluid in the bag and in cavity 5 will be maintained at a higher pressure than the well liquid. Therefore, any leakage through double seal 28 will be by the oil out of cavity 5.

Referring now to Fig. 2 of the drawing, it will be seen that recess 31 is formed by flanges 29 and 30 of seal 28 and surface 48 of flange 3, and communicates with the interior of seal 28 through openings 69 in seal housing 67. It is joined by a passage 49 to an opening 50 in flange 3 whereby a fluid such as oil may be poured in to fill recess 31. Opening 50 in flange 3 is normally closed by a plug 51. A generally cylindrical cavity 52 having a small-diameter passageway 53 is provided in flange 3. Cavity 52 and passageway 53 connect passage 49 with motor cavity 5. Passageway 53 is achieved by inserting bushing-like member 54 in opening 55 in flange 3. Member 54 has part of its length formed with an outside diameter as at 56 which is slightly smaller than the diameter of cavity 52. A flexible finger-like member 57 has its open end communicating with passageway 53 and cavity 5. The end 58 of member 57 separates passageway 49, and consequently the seal fluid, from cavity 52 which is filled with the motor fluid. Finger 57 is firmly held in place between flange 3 and portion 56 of member 54 by a flange 59 extending into an annular space 60 between member 54 and flange 3.

The seal 28 comprises an annular member 61 secured to shaft extension 19 by a ring 70 formed of a material such as rubber or neoprene, and rotating therewith. A spring 71 is anchored at one end against a diaphragm 72 secured to seal housing 67, and presses against ring 73 at its other end. By this means surface 74 of ring 73 is pressed against rotating member 61 to effect a seal. This sequence is duplicated on the other side of member 61 by spring 75, diaphragm 76, and ring 77.

When shaft 11 is rotated by motor 1, member 61 will rotate with the shaft. Since rings 73 and 77, forming part of seal 28, must press fairly tightly against member 61 in order to obtain a good seal, the consequent friction will cause considerable heating of the fluid in recess 31.

If no provision is made for alleviation of this condition, the heating and increase in pressure of this fluid will eventually cause serious harm to seal 28 by depriving diaphragms 72 and 76 of their resilience and ability to make up for manufacturing deviations from proper tolerances. However with the structure of this invention the increase in the seal fluid pressure will cause the pressure from passageway 49 against end 58 of finger 57 to be greater than the pressure of the fluid in motor cavity 5 and in cavity 52. Finger 57 will therefore collapse to provide a greater space for the fluid in recess 31 and passage 49 and thus cause the pressure of this fluid to decrease. Thus the pressure of this fluid will be kept from any substantial rise however long motor 1 is run and harm to seal 28 is substantially avoided.

The above result is achieved without any appreciable increase in the pressure in motor cavity 5 since the volume of cavity 5 is far greater than that of recess 31.

It will now be seen that this invention provides an improved submersible dynamoelectric machine construction wherein a double seal is used to afford greater protection against leakage of fluid either into or out of the motor cavity and wherein provision has been made to accommodate heating and expansion of the seal fluid in order substantially to increase the effective life of the seal, and that this construction is characterized by its simplicity and ease of assembly.

While I have shown and described a specific embodiment of this invention, further modifications and improvements will occur to those skilled in the art. I desire that it be understood, therefore, that this invention is not limited to the form shown and I intend in the appended claims to cover all modifications which do not depart from the spirit and scope of this invention.

What I claim as new and desire to secure by Letters Patent of the United States is:

1. A submersible dynamoelectric machine comprising an outer casing, a flexible wall secured to said casing and defining a stator and rotor cavity therewith, a stator member mounted in said casing within said cavity, a cooperating rotor member in said cavity and mounted on a shaft, sealing means mounted in said casing about said shaft, said sealing means and said casing defining therebetween a recess, a deformable flexible member secured to said casing and having one surface in communication with said stator and rotor cavity, said member having at least part of its other surface in communication with said recess, said recess being adapted to be filled with a fluid, said cavity being adapted to be filled with a fluid, said flexible wall having an outer surface adapted to be subjected to the pressure outside said dynamoelectric machine, means arranged to exert a predetermined force on said flexible wall biasing the same into said cavity thereby to cause the pressure within said cavity to be a predetermined amount greater than the pressure outside said dynamoelectric machine whereby an increase in pressure of the fluid in said recess over the pressure of the fluid in said cavity will cause said member to be deformed thereby increasing the volume of said recess and lowering the pressure of the fluid therein.

2. A submersible dynamoelectric machine comprising an outer casing, a flexible wall secured to said casing and defining a stator and rotor cavity therewith, a stator member mounted in said casing within said cavity, a cooperating rotor member in said cavity and mounted on a shaft, sealing means mounted in said casing about said shaft, said sealing means and said casing defining therebetween a substantially annular recess, a hollow deformable member secured to said casing and having its interior surface in communication with said stator and rotor cavity, said member having at least part of its outer surface in communication with said recess, said recess being adapted to be filled with a fluid, said cavity being adapted to be filled with a fluid, said flexible wall having an outer surface adapted to be subjected to the pressure outside said dynamoelectric machine, means arranged to exert a predetermined force on said flexible wall biasing the same into said cavity thereby to cause the pressure within said cavity to be a predetermined amount greater than the pressure outsde said dynamoelectric machine whereby an increase in pressure of the fluid in said recess over the pressure of the fluid in said cavity will cause said member to partially collapse thereby increasing the volume of said recess and lowering the pressure of the fluid therein.

3. A submersible dynamoelectric machine comprising a pair of spaced apart end flange members, an outer shell member mounted on said end flange members and defining a stator and rotor cavity therewith, a stator member mounted in said shell member within said cavity, a cooperating rotor member in said cavity and mounted on a shaft, one of said end flange members having an opening formed therein with said shaft extending therethrough, sealing means adjacent said opening about said shaft and comprising two axially displaced circular flanges having equal diameters, said flanges defining an annular recess, a flexible hollow finger-shaped member secured to said one end flange member and having its interior surface in communication with said cavity, said one end flange member having a passage therein extending from said recess to an area on the outer surface of said finger member whereby said recess is in communication with said area, said recess and passage being adapted to be filled with a fluid, said cavity being adapted to be filled with fluid, and means adapted to maintain fluid in said cavity at a pressure higher than that outside said dynamoelectric machine comprising a collapsible bag secured to the other of said end flange members and having its interior surface in communication with said cavity, and its outer surface subject to the pressure outside said dynamoelectric machine, and further comprising spring means adapted to compress said collapsible bag, whereby an increase in pressure of the fluid in said recess and said passage over the pressure of the fluid in said cavity will cause said finger member to tend to collapse thereby increasing the volume of said recess and said passage collectively and lowering the pressure of the fluid therein.

4. A submersible dynamoelectric machine comprising a pair of spaced apart end flange members, an outer shell member mounted on said end flange members and defining a stator and rotor cavity therewith, a stator member mounted in said shell member within said cavity, a cooperating rotor member in said cavity and mounted on a shaft, one of said end flange members having an opening formed therein with said shaft extending therethrough, sealing means adjacent said opening about said shaft and comprising two axially displaced circular flanges having equal diameters, said flanges defining an annular recess therebetween said sealing means further comprising a housing connecting said flanges, rotating member encircling and fastened to said shaft within said housing, a pair of stationary annular members abutting said rotating member, and means biasing said stationary members against said rotating member, said housing having openings therein to connect the interior thereof to said recess, a second opening formed in said one end flange extending from said cavity, said second opening being parallel to said shaft, said one end flange having a passage connecting said recess and said second opening, a hollow flexible finger in said second opening secured to said one end flange and providing a fluid-tight separation between said cavity and said recess and passage, said finger having its open end adjacent said cavity and having its closed end extending into said passage, said recess and passage being adapted to be filled with a fluid, said cavity being adapted to be filled with a fluid, and means adapted to maintain fluid in said cavity at a higher than that outside said dynamoelectric machine comprising a collapsible bag secured to the other of said end flange members and having its interior surface in communication with said cavity, and further comprising spring means adapted to compress said collapsible bag, whereby an increase in pressure of the fluid in said recess and said passage over the pressure of the fluid in said cavity will cause said finger member to tend to collapse thereby increasing the volume of said recess and said passage collectively and lowering the pressure of the fluid therein.

5. A submersible dynamoelectric machine comprising an outer casing, a flexible wall secured to said casing and defining a stator and rotor cavity therewith, a stator member mounted within said cavity, a cooperating rotor member in said cavity and mounted on a shaft, sealing means mounted in said casing about said shaft and defining with said casing a recess therebetween, expansible means secured to said casing, said recess being adapted to be filled with a fluid, said cavity being adapted to be filled with a fluid, one side of said means being subject to pressure from fluid in said recess and the other side of said means being subject to pressure from fluid in said cavity, said flexible wall having an outer surface adapted to be subjected to the pressure outside said dynamoelectric machine, means arranged to exert a predetermined force on said flexible wall biasing the same into said cavity thereby to cause the pressure within said cavity to be a predetermined amount greater than the pressure outside said dynamoelectric machine whereby an increase in pressure of the fluid in said recess over the pressure in said cavity will cause said means to expand thereby increasing the volume of said recess and lowering the pressure of the fluid therein.

References Cited in the file of this patent
UNITED STATES PATENTS

| | | |
|---|---|---|
| 2,404,783 | Blom | July 30, 1946 |
| 2,569,741 | Arutunoff | Oct. 2, 1951 |
| 2,674,702 | Arutunoff | Apr. 6, 1954 |